(12) United States Patent
Hayter et al.

(10) Patent No.: US 7,287,649 B2
(45) Date of Patent: *Oct. 30, 2007

(54) SYSTEM ON A CHIP FOR PACKET PROCESSING

(75) Inventors: Mark D. Hayter, Menlo Park, CA (US); Shailendra S. Desai, San Jose, CA (US); Daniel W. Dobberpuhl, Menlo Park, CA (US); Kwong-Tak A. Chui, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 801 days.

This patent is subject to a terminal disclaimer.

(21) Appl. No.: 09/861,188

(22) Filed: May 18, 2001

(65) Prior Publication Data
US 2002/0174252 A1 Nov. 21, 2002

(51) Int. Cl.
*G06F 13/00* (2006.01)
(52) U.S. Cl. .................................................. 209/218
(58) Field of Classification Search ........ 709/230–237, 709/250; 711/117–132; 370/431–444; 712/32–41
See application file for complete search history.

(56) References Cited

U.S. PATENT DOCUMENTS

| | | |
|---|---|---|
| 4,433,378 A | 2/1984 | Leger |
| 4,463,424 A | 7/1984 | Mattson et al. |
| 4,760,571 A | 7/1988 | Schwarz |
| 5,640,399 A | 6/1997 | Rostoker et al. |
| 5,668,809 A | 9/1997 | Rostoker et al. |
| 5,778,414 A | 7/1998 | Winter et al. |
| 5,802,287 A | 9/1998 | Rostoker et al. |
| 5,829,025 A | 10/1998 | Mittal |
| 5,887,187 A | 3/1999 | Rostoker et al. |
| 5,893,150 A | 4/1999 | Hagersten et al. |
| 5,908,468 A | 6/1999 | Hartmann |
| 5,914,955 A | 6/1999 | Rostoker et al. |
| 5,974,508 A | 10/1999 | Maheshwari |

(Continued)

FOREIGN PATENT DOCUMENTS

EP        0 498 201        8/1992

(Continued)

OTHER PUBLICATIONS

Popescu et al., The Metaflow Architecture, IEEE Micro, Jun. 1991, pp. 10-13 and 63-73.*

(Continued)

*Primary Examiner*—Robert B. Harrell
(74) *Attorney, Agent, or Firm*—Garlick Harrison & Markison

(57) ABSTRACT

A packet processing system may include a processor, a cache, a memory controller, and at least one packet interface circuit integrated into a single integrated circuit. In one embodiment (which may be used in integrated or non-integrated systems), the packet interface circuit is configured to cause allocation in the cache of a portion of a received packet. In one embodiment (which may be used in integrated or non-integrated systems), the memory controller may be configured to selectively block memory transactions. Particularly, the memory controller may implement at least two block signals, one for the packet interface circuit and one for other devices. The block signals may be used to control the initiation of memory transactions when the memory controller's input queue is approaching fullness.

13 Claims, 9 Drawing Sheets

U.S. PATENT DOCUMENTS

| | | | |
|---|---|---|---|
| 6,018,763 | A | 1/2000 | Hughes et al. |
| 6,021,451 | A * | 2/2000 | Bell et al. .................... 710/309 |
| 6,092,137 | A | 7/2000 | Huang et al. |
| 6,098,064 | A | 8/2000 | Pirolli et al. |
| 6,111,859 | A | 8/2000 | Godfrey et al. |
| 6,151,662 | A | 11/2000 | Christie |
| 6,157,623 | A | 12/2000 | Kerstein |
| 6,202,125 | B1 * | 3/2001 | Patterson et al. ........... 711/118 |
| 6,202,129 | B1 | 3/2001 | Palanca et al. |
| 6,209,020 | B1 | 3/2001 | Angle et al. |
| 6,215,497 | B1 | 4/2001 | Leung |
| 6,262,594 | B1 | 7/2001 | Cheung et al. |
| 6,266,797 | B1 | 7/2001 | Godfrey et al. |
| 6,269,427 | B1 | 7/2001 | Kuttanna et al. |
| 6,279,087 | B1 | 8/2001 | Melo et al. |
| 6,321,309 | B1 | 11/2001 | Bell et al. |
| 6,332,179 | B1 | 12/2001 | Okpisz et al. |
| 6,349,365 | B1 | 2/2002 | McBride |
| 6,366,583 | B2 | 4/2002 | Rowett et al. |
| 6,373,846 | B1 | 4/2002 | Daniel et al. |
| 6,393,487 | B2 * | 5/2002 | Boucher et al. ............ 709/238 |
| 6,438,651 | B1 | 8/2002 | Slane |
| 6,526,462 | B1 * | 2/2003 | Elabd ........................ 710/242 |
| 6,574,708 | B2 | 6/2003 | Hayter et al. |
| 6,748,495 | B2 * | 6/2004 | Rowlands et al. .......... 711/133 |

FOREIGN PATENT DOCUMENTS

| | | |
|---|---|---|
| EP | 0 748 087 | 12/1996 |
| WO | 00/30322 | 5/2000 |
| WO | WO 00/30322 | 5/2000 |
| WO | 00/52879 | 9/2000 |
| WO | WO 00/52879 | 9/2000 |

OTHER PUBLICATIONS

"PowerPC 601," RISC Microprocessor User's Manual, Revision 1, Motorola, Inc. 1993, p. 8-14.

Intel, "Pentium Processor Family User's Manual," vol. 1: Pentium Processor Family Data Book, 1994, pp. 5-23 and 5-50.

"ATLAS I: A Single-Chip, Gigabit ATM Switch with HIC/HS Links and Multi-Lane Back-Pressure," Katevenis, et al., IPC Business Press LTD., Long, GB, vol. 21, No. 7-8, Mar. 30, 1998, XP004123981, 5 pages.

"An Introductory VHDL Tutorial: Chapter 1—An Introduction and Background," 1995, Green Mountain Computing Systems, XP002212233, 2 pages.

International Search Report for 02253533.0-1525, Oct. 11, 2002.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

*Pentium® Pro Family Developer's Manual, vol. 1: Specifications*, Chapter 4, pp. 1-18, 1996.

Katevenis et al.; "ATLAS I: a single-chip, gigabit ATM switch with HIC/HS links and multi-lane back-pressure";Microprocessors and Microsystems, IPC Business Press Ltd.; vol. 21, No. 7-8 Mar. 30, 1998; pp. 481-490.

Green Mountain Computing Systems; "An Introductory VHDL Tutorial: Chapter 1—Introduction and Background, Chapter 2—Structural Descriptions"; on line publication, http://www.gmvhd1.com/VHDL.html.

* cited by examiner

SYSTEM ON A CHIP FOR PACKET PROCESSING

BACKGROUND OF THE INVENTION

1. Field of the Invention

This invention is related to the fields of packet processing, networking, and system on a chip.

2. Description of the Related Art

Networking of computer systems and other electronic devices has become more and more prevalent, at all levels of the network. Computer systems in offices, and sometimes even homes, are networked in local area networks (LANs). Geographically distant computer systems can be network in wide area networks (WANs). The Internet can be considered an example of a WAN.

Typically, systems on a network communicate with each other using packets. The packet includes a header and data. The header identifies the sending and receiving systems, and may include other information such as the length of the packet, a packet type, etc. Depending on the topology of the network, packets may need to be routed from the sending system to the receiving system. The routing generally involves one or more devices in the network examining the packet to identify its destination and transmitting the packet to another device until the packet arrives at the destination device. Additionally, packets may be examined during transmission to provide such features as quality of service (QoS), caching of information, etc. Accordingly, high performance packet processing is critical to the performance of the network as a whole.

SUMMARY OF THE INVENTION

A packet processing system is described. A processor, a cache, a memory controller, and at least one packet interface circuit may be integrated into a single integrated circuit. In one implementation, the design may take advantage of the integration to form tight coupling between the processor, cache, memory controller, and packet interface circuit. For example, interrupts to the processor may be tightly coupled, with low latency to the interrupt as well as low latency access to interrupt status/reason registers. Memory coherency may be maintained among the devices, which may reduce the latency from a write by one device being visible to other devices. The memory coherency and low latency access to memory by the packet interface circuit may provide tight coupling for descriptors used to store packet data.

In one embodiment (which may be used in integrated or non-integrated systems), the packet interface circuit is configured to cause allocation in the cache of a portion of a received packet. Particularly, the portion may include bytes expected to be processed by the processors, while the remaining packet data may be stored in memory. The processors may experience cache latencies for access to the packet data, and cache pollution with data that is not accessed by the processors may be avoided.

In one embodiment (which may be used in integrated or non-integrated systems), the memory controller may be configured to selectively block memory transactions. Particularly, the memory controller may implement at least two block signals, one for the packet interface circuit and one for other devices. The block signals may be used to control the initiation of memory transactions when the memory controller's input queue is approaching fullness. Particularly, the block signal for the other devices may be asserted when the queue still has entries remaining (e.g. at about 75% fullness, although the threshold may be programmable to any level), to reduce the latency which may be experienced by read memory transactions from the packet interface circuit (for reading packet data to be transmitted on the external packet interface) when the queue is filling with transactions. In some embodiments, the failure to continuously transmit a full packet on the external packet interface may result in the packet transmission failing and having to be retransmitted. By reducing the latency, the likelihood that subsequent cache blocks of the packet are not available in the packet interface circuit when needed may be reduced.

Broadly speaking, an apparatus is contemplated comprising a processor coupled to an interconnect; a cache coupled to the interconnect; a memory controller coupled to the interconnect; and a packet interface circuit for receiving packets from a packet interface and causing the packets to be transmitted on the interconnect for storage. The processor, the cache, the memory controller, and the packet interface circuit are integrated into a single semiconductor substrate. The processor is programmable to process the packets received by the packet interface.

Moreover, a method is contemplated. A packet is received from a packet interface in a packet interface circuit. The packet is transmitted for storage on an interconnect to which a cache, a memory controller, and a processor are coupled. The processor, the cache, the memory controller, and the packet interface circuit are integrated into a single semiconductor substrate.

BRIEF DESCRIPTION OF THE DRAWINGS

The following detailed description makes reference to the accompanying drawings, which are now briefly described.

Figure 1:
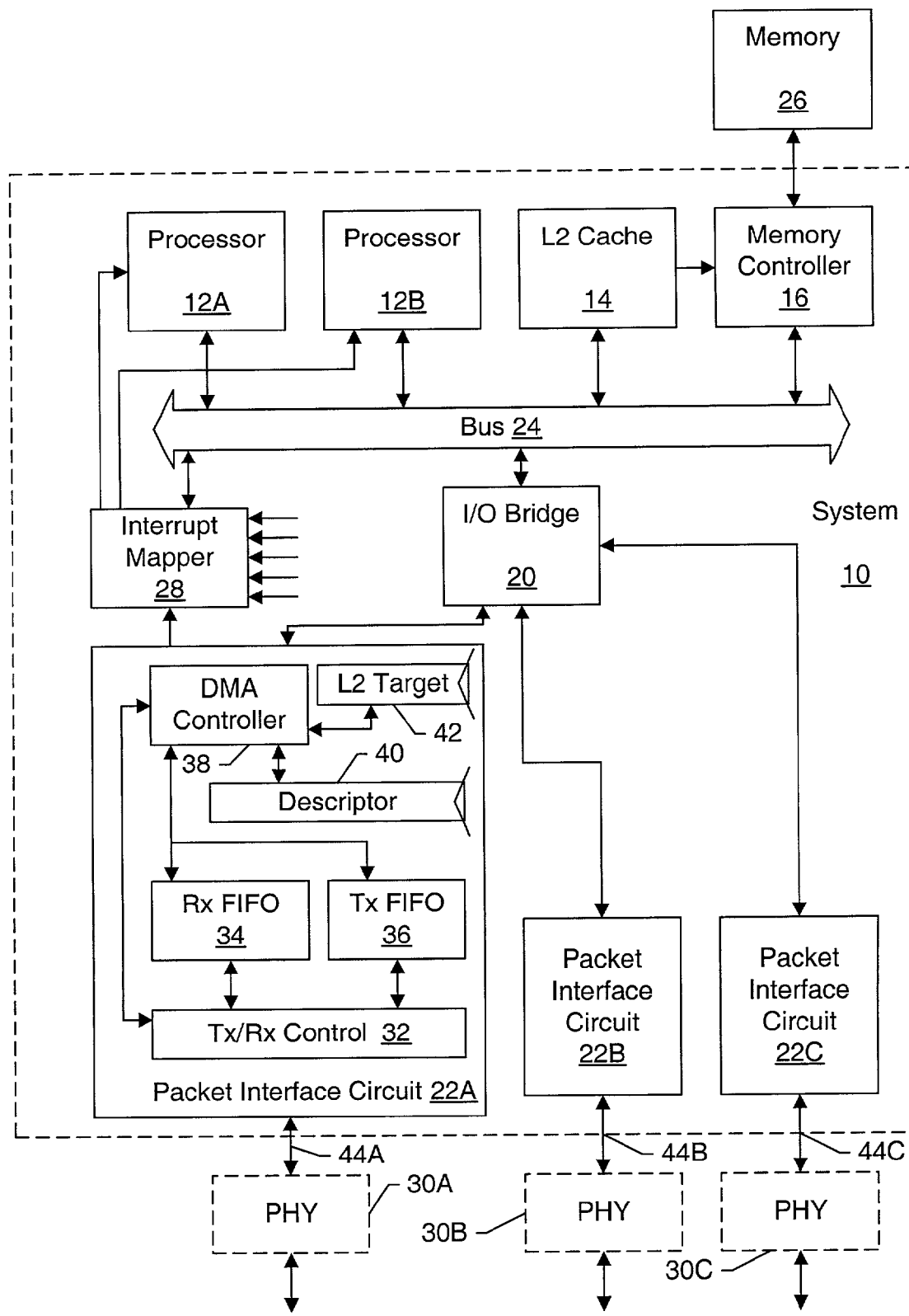
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a system 10 is shown. Other embodiments are possible and contemplated. In the embodiment of FIG. 1, the system 10 includes processors 12A-12B, an L2 cache 14, a memory controller 16, an input/output (I/O) bridge 20, a set of packet interface circuits 22A-22C, and an interrupt mapper 28. The system 10 may include a bus 24 for interconnecting the various components of the system 10. As illustrated in FIG. 1, each of the processors 12A-12B, the L2 cache 14, the memory controller 16, and the I/O bridge 20 are coupled to the bus 24. Thus, each of the processors 12A-12B, the L2 cache 14, the memory controller 16, and the I/O bridge 20 may be an agent on the bus 24 for the illustrated embodiment. The interrupt controller 28 is also shown coupled to the bus 24 for communicating with the processors 12A-12B (e.g. the processors 12A-12B may read status/reasons registers in the interrupt controller 28). The I/O bridge 20 is coupled to the packet interface circuits 22A-22C, which are further coupled to respective physical layer circuits (PHYs) 30A-30C. The interrupt mapper 28 is coupled to provide interrupts to the processors 12A-12B and is further coupled to receive interrupt requests from the packet interface circuits 22A-22C (for example, the coupling of the packet interface circuit 22A is illustrated in FIG. 1) and from other devices within the system 10 (not shown). The L2 cache 14 is coupled to the memory controller 16, which is further coupled to a memory 26. The packet interface circuit 22A is shown in greater detail in FIG. 1, and packet interface circuits 22B-22C may be configured similarly. Specifically, in the embodiment of FIG. 1, the packet interface circuit 22A includes a Tx/Rx control circuit 32, an Rx FIFO 34, a Tx FIFO 36, a DMA controller 38, one or more descriptor configuration registers 40, and a configuration register 42 storing an L2 target value. The DMA controller 38 is coupled to the Tx/Rx control circuit 32, the Rx FIFO 34, the Tx FIFO 36, the descriptor configuration registers 40, and the configuration register 42. The Tx/Rx control circuit 32 is further coupled to the Tx FIFO 36 and the Rx FIFO 34.

In one implementation, the system 10 (bounded by the dashed box enclosing the processors 12A-12B, the L2 cache 14, the memory controller 16, the interrupt mapper 28, the I/O bridge 20, the packet interface circuits 22A-22C, and the bus 24 in the illustrated embodiment) may be integrated onto a single integrated circuit in a system on a chip configuration. The system 10 may be designed to take advantage of the integration by tightly coupling the components to provide high performance packet processing. Specifically, the processors 12A-12B, the L2 cache 14, the memory controller 16, and the packet interface circuits 22A-22C (through the I/O bridge 20) may be tightly coupled to receive packets, process them, and forward the packets on (if necessary).

The tight coupling may be manifest in several fashions. For example, the interrupts may be tightly coupled. An I/O device (e.g. the packet interface circuits 22A-22C) may request an interrupt which is mapped (via the interrupt mapper 28) to one of the processors 12A-12B. The transmission of the interrupt to the processor may be rapid since the signals may be transmitted at the clock frequency of the integrated circuit comprising the system 10 (as opposed to interconnecting separate integrated circuits). When the processor 12A-12B executes the interrupt service routine, typically one or more status registers in the interrupt mapper 28 and/or the interrupting device are read. These status register reads may occur with relatively low latency across the bus 24 and the I/O bridge 20 (as opposed to, for example, a high latency peripheral bus such as PCI). The latency of the status register reads may, in some embodiments, be one or more orders of magnitude less than that of a peripheral bus such as PCI.

Another manifestation of the tight coupling may be the use of hardware based memory coherency among the integrated devices. The bus 24 may support coherent transactions such that cached copies of data in the agents (and, in the case of the I/O bridge 20, in the devices coupled to that agent) are appropriately manipulated so that a read of certain data receives the most recent update to the certain data. The enforced coherency may enhance the tight communication between the devices since updates made by one device are rapidly visible to the other devices which read the updated data.

Packet processing may occur in the system 10 as follows, in general: A packet interface circuit 22A-22C may receive a packet from the external interface 44A-44C to the packet interface circuit (e.g. the interface from the PHY circuits 30A-30C). The packet interface circuit is provided with one or more descriptors indicating data buffers in memory for storing packets, and selects a descriptor for the packet. The packet interface circuit DMA's the packet into memory through the I/O bridge 20 and the memory controller 16. When the packet is complete (or several packets are complete, in some embodiments), the packet interface circuit may interrupt one of the processors 12A-12B. Alternatively, one or both of the processors 12A-12B may monitor the status information in the descriptors. The packet interface circuits may update the descriptors when a packet is complete, and the processors 12A-12B may detect the update since the transaction to update the descriptor is coherent. The processor 12A-12B processes the packet or packets, and may retransmit the packet (through one of the packet interface circuits 22A-22C or another I/O device or interface) if desired. The system 10 may also generate packets in response to applications executing on the processors 12A-12B, and these packets may be transmitted as well. To transmit a packet through one of the packet interface circuits, the processor 12A-12B may copy the packet into a descriptor used by the desired packet interface circuit, and a status bit in the descriptor may be changed to indicate that the packet is ready for transmission. Since the change is coherent, the packet interface circuit may rapidly receive the change and may begin transmitting the packet.

The Tx/Rx control circuit 32 may include a media access controller (MAC) circuit according to the Ethernet specification. Particularly, in one implementation, the Tx/Rx control circuit 32 may be compliant with the MAC portion of the Institute for Electrical and Electronic Engineers (IEEE) specification 802.3 for 10 Megabit/second, 100 Megabit/second, and 1 Gigabit/second rates. In one implementation, the Tx/Rx control circuit 32 may also be configurable to operate as a generic packet receiver/transmitter.

For example, the start or end of packets may be flagged using control signals on the external interface 44A-44C and the data transferred between consecutive starts or ends may be treated as one packet. Finally, one implementation may allow the three packet interface circuits 22A-22C to be operated as two 16 bit packet receiver/transmitters.

The interface between each packet interface circuit 22A-22C and external devices (reference numerals 44A-44C in FIG. 1) may be the Media Independent Interface (MII) or the Gigabit MII (GMII) interfaces to the PHY circuits 30A-30C. Alternatively, the external interface may be a generic packet interface in which either the start or end of packets is flagged using control signals. In yet another alternative, the three external interfaces may be operable as two wider packet interfaces (e.g. the 16 bit interfaces mentioned above). The packet interface circuits may be configurable (e.g. during reset) to operate the interface in any of the above modes.

The packet interface circuit 22A is illustrated in greater detail for one embodiment in FIG. 1. As mentioned above, the other packet interface circuits 22B-22C may be configured similarly. The Tx/Rx control circuit 32 may include the circuitry for implementing Ethernet MAC operation, and may further include circuitry for implementing the generic packet interfaces as described above. The Rx FIFO 34 is a first in, first out buffer for receiving packets from the interface 44A for storage in memory. The Tx FIFO 36 is similarly a FIFO for receiving packets from memory for transmission on the interface 44A. Generally, each of the FIFOs 34 and 36 may include a plurality of entries for storing packet data (which may include a header, the data payload, and a trailer). The FIFOs may not be large enough to store an entire packet at once, but may generally be used to buffer the system 10 from the line rates of the external interface 44A from the bus 24. Generally, as packet data is received on the interface 44A, the Tx/Rx control circuit 32 stores the data in the Rx FIFO 34. Additionally, the Tx/Rx control circuit 32 reads data from the Tx FIFO 36 for transmission on the interface 44A.

The DMA controller 38 is provided for transferring the packet data to and from memory (and/or the L2 cache 14). The descriptor configuration registers 40 locate the descriptors allocated to the packet interface circuit 22A. Each descriptor includes a pointer to at least one data buffer in memory (a reserved area in memory allocated to the descriptor by software executing on the processors 12A-12B). The descriptor may also include status information corresponding to the data buffer. The DMA controller DMAs data to the Tx FIFO 36 (for transmission on the interface 44A) from a data buffer storing a packet to be transmitted, and DMAs data from the Rx FIFO 34 to a data buffer in response to receiving packets. The DMA comprises one or more transactions on the bus 24. The bus 24 may be configured to transfer up to one cache block of data per transaction, so the number of transactions per packet depends on the number of cache blocks in the packet. Generally, the DMA controller 38 may allow a cache block of packet data to accumulate in the Rx FIFO 34 and then may initiate a transaction on bus 24 to transfer the cache block. If the last byte of a packet is received and an incomplete cache block remains, the DMA controller 38 may transfer the incomplete cache block (e.g. as a less than cache block transfer or by reading the block first, modifying the block with the received data, and writing the cache block back to memory). Similarly, if the Tx FIFO 36 has enough free entries to store a cache block of a packet being transferred, the DMA controller 38 may initiate a transaction to read the next cache block of the packet and store the block in the Tx FIFO 36.

For received packets, the Tx/Rx control circuit 32 may be configured to indicate the beginning of the packet in the Rx FIFO 34. In one implementation, for example, the Rx FIFO 34 may include status information for each entry. The status information may indicate whether or not the entry is the start of a packet. Alternatively, the Rx/Tx control circuit 32 may communicate with the DMA controller 38 directly to indicate which entries are the start of a packet.

The DMA controller 38 may be configured, in one embodiment, to target a portion of a received packet for storage in the L2 cache 14. Specifically, it may be desirable for the header of a packet to be stored in the L2 cache 14, while the data payload may be stored in memory. The processor 12A-12B which processes the packet may typically be operating on the header information, and may not operate on the data payload. If the header is stored in the L2 cache 14, the latency experienced by the processor 12A-12B in reading the header may be reduced. While many packet processing functions may require only access to the header, it is becoming more common to process a portion of the data payload as well when processing a packet (e.g. to attempt more complex features such as web caching). Thus, it may be desirable to store a portion of the data payload of a packet in the L2 cache 14 as well. However, it may be desirable to store portions of the packet which are not operated on by the processors 12A-12B in memory to avoid polluting the L2 cache 14 with data that is not accessed by the processors 12A-12B. Accordingly, the packet interface circuit 22A includes the configuration register 42 which is programmed with a size of the portion at the beginning of a packet which is to be stored into the L2 cache 14. The remaining bytes may be stored in memory. Additional details regarding storing a portion of the packet in the L2 cache 14 are provided further below. It is noted that, while the size of the portion of the packet to be stored in the L2 cache 14 is programmable in the configuration register 42 in the illustrated embodiment, the size may be fixed in hardware in other embodiments, as desired. The size may be programmed as a number of bytes (which the DMA controller 38 may convert to a number of cache blocks encompassing the bytes), a number of cache blocks, etc.

As mentioned above, the Tx FIFO 36 may not be large enough to store an entire packet for transmission. To transmit a packet, DMA controller 38 may perform transactions to read the packet data from memory and may store the data in the Tx FIFO 36. If the DMA controller 38 fills the Tx FIFO 36, the DMA controller 38 may stall further transactions until the Tx/Rx control circuit 32 transfers enough data out of the Tx FIFO 36 to provide space for another cache block of the packet data. On the Ethernet, once a packet begins transmission (and if there are no packet collisions), the packet is transmitted continuously. If the packet cannot be transmitted continuously, it is dropped by the receiver and must be retransmitted. Accordingly, it may be desirable to keep the Tx FIFO 36 from becoming empty until the packet is completely transmitted.

However, in some cases, the combination of competition for the bus 24 and the number of memory transactions queued in the memory controller 16 may delay the DMA controller 38 long enough for the Tx FIFO 36 to become empty. In order to counteract this effect at least partially, the memory controller 16 may selectively block transactions from other agents when the input buffer of the memory controller 16 is approaching fullness. For example, system 10 may employ a transaction blocking scheme in which the memory controller 16 employs at least two block signals: One for the packet interface circuits 22A-22C and another for the other agents. The block signals are used to block the issuance of new transactions to the memory controller (e.g. because the input buffer of the memory controller is full). A source receiving an asserted block signal from the memory controller 16 is precluded from initiating transactions to the memory controller 16. The source may inhibit arbitration for the bus if the source has only memory transactions to perform.

The block signal to the other agents may be asserted before the input buffer is actually full (e.g. when the buffer is about 75% full), thus holding off the other agents and allowing the packet interface circuits 22A-22C to continue performing transactions to the memory controller 16 when the memory controller 16 is filling with transactions to be serviced. The block signal for the packet interface circuits 22A-22C, on the other hand, may be asserted when the input buffer is approximately full. The use of separate block signals may have the effect of reducing the maximum latency experienced by the packet interface circuits 22A-22C when the memory controller 16 is receiving large numbers of requests. Furthermore, since the other agents may inhibit arbitration if they have only memory transactions to perform, the use of the block signals may have the effect of allowing the packet interface circuits 22A-22C to bypass the arbitration mechanism and receive more bus bandwidth on the bus 24 during such times than would be the case if all other agents were permitted to arbitrate. For example, if the arbitration mechanism were round-robin priority scheme (in which the arbitration priority of an agent is changed to lowest priority when the agent wins arbitration for the bus 24 and the highest priority requesting agent wins the arbitration), the packet interface circuits 22A-22C may be granted the bus once and then not be granted again until each other arbitrating agent is granted the bus. This added latency could further cause the Tx FIFO 36 to empty prior to completing transfer of a packet. Since the other arbitrating agents (if they have only memory transactions to perform) inhibit arbitration in response to the block signal they receive from the memory controller, the packet interface circuits 22A-22C effectively bypass the arbitration and may win arbitration more frequently.

In one embodiment, the DMA controller may comprise one or more transmit DMA channels and one or more receive DMA channels. The size of the portion of the packet to be stored in the L2 cache 14 may be programmable on a channel by channel basis, if desired. Each channel may be provided separate sets of descriptors via descriptor configuration registers 40 as well.

It is noted that, while Ethernet MACs are used in the present embodiment, other embodiments may support any type of packet interface. For example, in some modes, the above embodiments support a generic packet interface. Other packet interfaces may include X.25, Frame Relay, Asynchronous Transfer Mode (ATM), etc. Thus, embodiments of the system 10 are contemplated which include any type of packet interface circuit. A packet interface circuit is a circuit configured to receive packets from a packet interface and store the packets for processing. In various implementations, packet interfaces may filter packets based on predetermined filtering criteria (e.g. addresses), strip overhead from the packet data which corresponds to the packet interface circuit level (e.g. the MAC overhead), check the packet for errors (e.g. CRC errors, size errors, etc.)

The interrupt mapper 28 may employ any mapping mechanism. In one embodiment, the interrupt mapper 28 may comprise a mask bit and a map register for each interrupt request and for each processor 12A-12B. The mask bit indicates whether or not the interrupt is masked to the particular processor 12A or 12B, and the map register indicates which of the interrupt lines on that particular processor 12A or 12B the interrupt request is mapped to. If an embodiment of the processors 12A-12B includes only one interrupt line, the map registers may be deleted. Generally, if an interrupt request is received and is not masked, the interrupt mapper 28 asserts the interrupt signal to the processor 12A or 12B as specified in the map register.

The processors 12A-12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While the system 10 as shown in FIG. 1 includes two processors, other embodiments may include one processor or more than two processors, as desired.

The L2 cache 14 is a high speed cache memory. The L2 cache 14 is referred to as "L2" since the processors 12A-12B may employ internal level 1 ("L1") caches. If L1 caches are not included in the processors 12A-12B, the L2 cache 14 may be an L1 cache. Furthermore, if multiple levels of caching are included in the processors 12A-12B, the L2 cache 14 may be an outer level cache than L2. The L2 cache 14 may employ any organization, including direct mapped, set associative, and fully associative organizations. In one particular implementation, the L2 cache 14 may be a set associative cache (in general N way, N being an integer, although a 4 way cache may be used in one implementation) having 32 byte cache blocks. A set associative cache is a cache arranged into multiple sets, each set comprising two or more entries. A portion of the address (the "index") is used to select one of the sets (i.e. each encoding of the index selects a different set). The entries in the selected set are eligible to store the cache block accessed by the address. Each of the entries within the set is referred to as a "way" of the set. The portion of the address remaining after removing the index (and the offset within the cache block) is referred to as the "tag", and is stored in each entry to identify the cache block in that entry. The stored tags are compared to the corresponding tag portion of the address of a memory transaction to determine if the memory transaction hits or misses in the cache, and is used to select the way in which the hit is detected (if a hit is detected).

The memory controller 16 is configured to access the memory 26 in response to memory transactions received on the bus 24. The memory controller 16 receives a hit signal from the L2 cache 14, and if a hit is detected in the L2 cache 14 for a memory transaction, the memory controller 16 does not respond to that memory transaction. Other embodiments may not include the L2 cache 14 and the memory controller 16 may respond to each memory transaction. If a miss is detected by the L2 cache 14, or the memory transaction is non-cacheable, the memory controller 16 may access the memory 26 to perform the read or write operation. The memory controller 16 may be designed to access any of a variety of types of memory. For example, the memory controller 16 may be designed for synchronous dynamic random access memory (SDRAM), and more particularly double data rate (DDR) SDRAM. Alternatively, the memory controller 16 may be designed for DRAM, Rambus DRAM (RDRAM), SRAM, or any other suitable memory device.

The I/O bridge 20 links the packet interface circuits 22A-22C (and potentially one or more other I/O devices or I/O interfaces) to the bus 24. The I/O bridges 20 may serve to reduce the electrical loading on the bus 24. Generally, the I/O bridge 20 performs transactions on the bus 24 on behalf of the packet interface circuits 22A-22C and relays transactions targeted at the packet interface circuits 22A-22C from the bus 24 to that packet interface circuit 22A-22C. Similarly, the I/O bridge 20 may route transactions to or from other I/O devices or interfaces to which it is coupled. In one implementation, a second I/O bridge (not shown) may be a bridge to a PCI interface and to a Lightning Data Transport (LDT) I/O fabric developed by Advanced Micro Devices, Inc. The LDT interface is also being referred to as the HyperTransport interface, although LDT may be used herein. The PCI bus and the LDT fabric may be provided external to the system 10 for connection of PCI or LDT peripheral devices. Other I/O devices/interfaces (including the packet interface circuits 22A-22C) may be bridged by the I/O bridge 20. The other I/O interfaces (not shown) may include one or more serial interfaces, Personal Computer Memory Card International Association (PCMCIA) interfaces, etc.

The bus 24 may be a split transaction bus, in one embodiment. The bus 24 may employ a distributed arbitration scheme, in one embodiment. In one embodiment, the bus 24 may be pipelined. The bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that, while the system 10 (and more particularly the processors 12A-12B, the L2 cache 14, the memory controller 16, the packet interface circuits 22A-22C, the I/O bridge 20, the interrupt mapper 26, and the bus 24) may be integrated onto a single integrated circuit as a system on a chip configuration in the above described embodiment, other embodiments may implement one or more of the devices as separate integrated circuits. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus 24 may not be pipelined, if desired. While a shared bus is used in the present embodiment, any sort of interconnect may be used in other embodiments (e.g. crossbar connections, point to point connections in a ring, star, or any other topology, meshes, cubes, etc.). Generally, an interconnect is any sort of communication medium.

It is noted that, while FIG. 1 illustrates the packet interface circuits 22A-22C coupled through the I/O bridge 20A to the bus 24, other embodiments may include the packet interface circuits 22A-22C directly coupled to the bus 24, if desired. Furthermore, the number of packet interface circuits 22A-22C may be varied from one to as many as desired.

As used herein, the term transaction refers to a communication between two or more agents on an interconnect (e.g. the bus 24). An agent initiating the transaction may be the requesting agent or source, and an agent responding to the transaction is a responding agent or target. The term "memory transaction" refers to a communication between a device and the memory system. The memory transaction includes an address identifying a storage location in the memory. In the illustrated embodiment, the memory transaction is transmitted on the bus 24 to the memory controller 16 (and may be serviced by the L2 cache 14 instead of the memory controller 16). Memory transactions may include read transactions (a transfer of data from memory to the device) and write transactions (a transfer of data from the device to memory). More generally, a read transaction may be a transfer of data from a target of the transaction to the source (or initiator) of the transaction and a write transaction may be a transfer of data from a source of the transaction to the target of the transaction.

Figure 2:
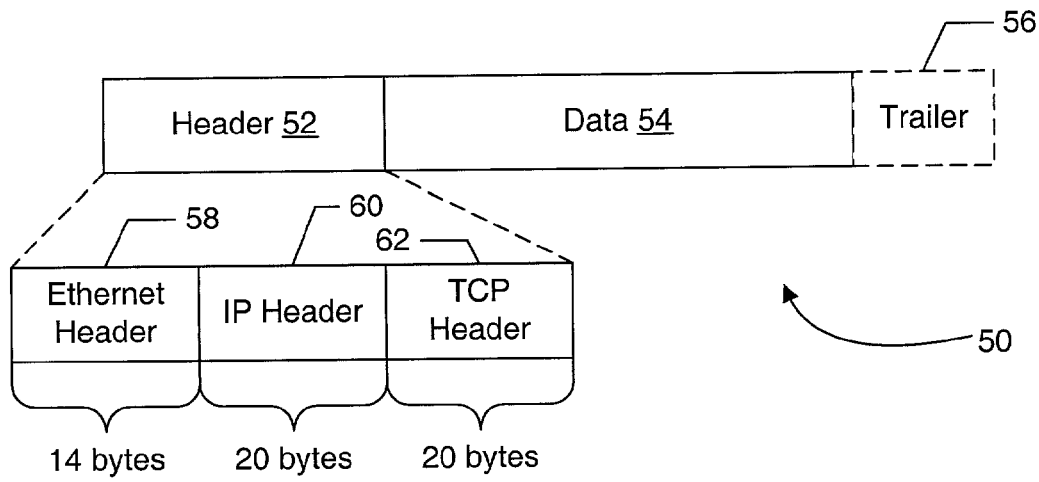
FIG. 2 is a block diagram of one embodiment of a packet.

Turning now to FIG. 2, an block diagram of an exemplary packet 50 is shown. Other embodiments are possible and contemplated. In the embodiment of FIG. 2, the packet 50 includes a header 52, a data payload 54, and an optional trailer 56. Each of the header 52, the data payload 54, and the trailer 56 may comprise any number of bytes. The header 52 is shown in exploded view for an Ethernet packet being used to transmit a transport control protocol/internet protocol (TCP/IP) packet, and includes an Ethernet header 58, an IP header 60, and a TCP header 62.

The header 52 describes the packet 50 so that the receiver of the packet may interpret the packet correctly. For example, the header may include one or more of the following: source and destination addresses for the packet, the size of the packet, the size of the header, and status/control information for the packet. The status/control information may include error checking information, priority information, packet type, etc.

As illustrated in the exploded view, the header 52 may actually comprise multiple headers corresponding to different layers of the networking protocol suite. Generally, at each layer, additional information may be used to describe the packet. The additional information encapsulates the information from the higher layers, so that communication at that layer need not know the format of the information from the higher layers.

In the example of FIG. 2, the header 52 includes the Ethernet header 58 comprising 14 bytes, the IP header 60 comprising 20 bytes, and the TCP header 62 comprising 20 bytes. Thus, for this example, the header 52 may be 54 bytes in size. The Ethernet header 58 may comprise two 6 byte Ethernet addresses (a source address and a destination address) and a length field comprising two bytes. The IP header 60 may include two 4 byte IP addresses (again, source and destination addresses) as well as a variety of other information including lengths of both the header and the IP packet, an IP version number, a type of service field, an identification field, a fragment offset, a time to live field, a protocol field, and a header checksum. Optionally, additional option fields may be provided (which increase the size of the IP header 60). The TCP header 62 may include source and destination port numbers, a sequence number identifying the packet in a sequence of packets, an acknowledgement number, a header length, a set of flag bits, a checksum, an urgent pointer, and a window size. Again, the TCP header may optionally be extended to hold additional options for a packet, as desired.

Depending on the packet processing to be performed, the processor 12A or 12B may operate on a portion of the header, the entire header, or even the entire header and a portion of the data payload. For example, if the packet is simply being routed on an Ethernet, the Ethernet header 58 may be operated on. If the packet is being routed on an IP network (i.e. the system 10 is part of an IP router), both the Ethernet header 58 and the IP header 60 may be operated on, or only the IP header 60 may be operated on, etc.

The data payload 54 is the data being transmitted with the packet. In some packets, the data payload 54 may not be included. For example, some TCP packets are acknowledgment packets sent to acknowledge the receipt of a previous packet. Such a packet need not have any data.

The optional trailer 56 may include additional packet description information, similar to the header 52. For example, Ethernet packets may include a cyclical redundancy check (CRC) value in the trailer 56.

It is noted that, while the illustrated packet 50 is an Ethernet packet carrying a TCP/IP packet, other Ethernet packets may carry other types of data. Furthermore, other types of packets may encapsulate the TCP/IP packet.

Figure 3:
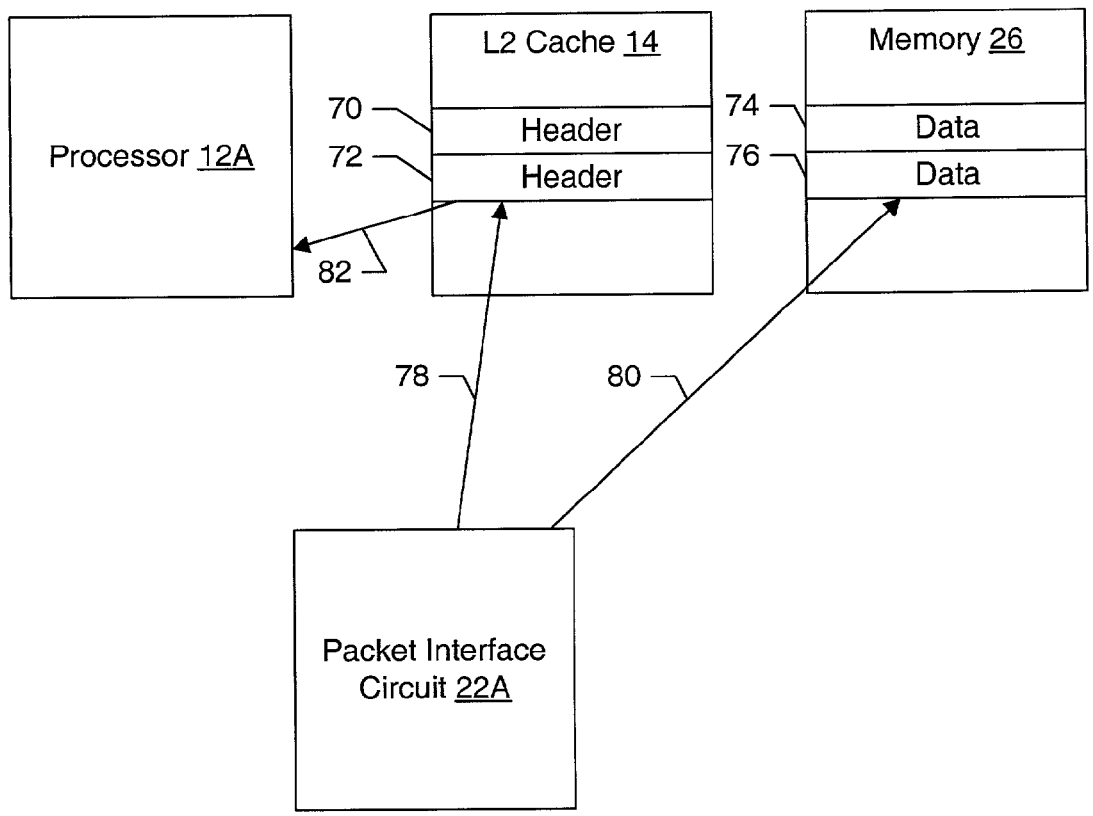
FIG. 3 is a diagram illustrating targeting of packet header data in the L2 cache.

It is noted that, while the example of FIG. 3 illustrates all of the header in the L2 cache 14 and all of the data payload in the memory 26, other examples may include some of the header stored in the L2 cache 14 (e.g. if that portion is not included in the L2 count programmed into the packet interface circuits 22A-22C) or some of the data stored in the L2 cache 14 (e.g. if the data is expected to be processed, the header of the packet is smaller than other packets, or the data is in the same cache block as the header).

Turning now to FIG. 3, a block diagram illustrating an example of the targeting of packet header in the L2 cache 14 is shown. Illustrated in FIG. 3 are the processor 12A, the L2 cache 14, the memory 26, and the packet interface circuit 22A. Arrows are used to illustrate the flow of information among the blocks shown in FIG. 3. Two cache block storage locations 70 and 72 are illustrated in the L2 cache 14, and two memory locations (of a cache block in size) 74 and 76 are illustrated in the memory 26.

For the example of FIG. 3, the packet interface circuit 22A receives a packet to be processed by the system 10. The packet interface circuit 22A is programmed (using the configuration register 42) to store the first two cache blocks of the packet in the L2 cache 14 (and the remaining blocks of the packet in the memory 26) in this example. Accordingly, when transferring the first two cache blocks of the packet, the packet interface circuit 22A causes the cache blocks to be stored in the L2 cache 14 (arrow 78). Generally, the packet interface circuit 22A provides information in the transactions to indicate which cache blocks should be stored in the L2 cache 14. An example is shown below in FIG. 4. The L2 cache 14 stores the blocks (shown as "Header" in FIG. 3).

When transferring the remaining cache blocks of the packet, the packet interface circuit 22A does not indicate that the cache blocks should be stored in the L2 cache (arrow 80). The memory 26 stores the remaining blocks (shown as "Data" in FIG. 3).

Subsequent to transferring the packet to memory, the packet interface circuit 22A may interrupt the processor 12A. Alternatively, the packet interface circuit 22A may update the descriptor corresponding to the packet to indicate that the packet is complete, and the processor 12A may be polling the descriptor to detect the update. In either case, the processor 12A may process the packet. Since the portion of the packet expected to be operated on by the processor is stored into the L2 cache 14 during the DMA of the packet by the packet interface circuit 22A, the processor 12A may experience L2 cache hits for the accesses to the packet data (arrow 82). The latency of the accesses may thus be reduced, which may lead to less overall time required to process the packet.

As mentioned above, the packet interface circuit 22A provides information in the transactions for transferring a received packet to memory which indicates which of the cache blocks are to be stored in the L2 cache 14 and which are not. Specifically, a control signal (referred to as L2CA below) transmitted during the address phases of the transactions may be used as the indication. Other embodiments may use command information or any other signalling to transfer the indication, or may transfer the indication during other phases of the transaction. During the address phase of the first N transactions of a packet (where N is determined by the value in the configuration register 42), the packet interface circuit 22A may assert the L2CA signal to cause the L2 cache 14 to store the data. During the remaining transactions, the packet interface circuit 22A may deassert the L2CA signal.

The L2 cache 14 responds to the L2CA signal for a transaction as follows: If the cache block is a miss in the L2 cache 14 and the L2CA signal is asserted, the L2 cache 14 allocates a cache block storage location to store the cache block. Generally, the allocation may include selecting a cache block storage location to store the block, evicting the block currently stored therein (if any), and updating the cache block storage location with the cache block. In one embodiment, the memory controller 16 may not update the memory 26 with the cache blocks allocated to the L2 cache 14, although in other embodiments the memory 26 may also be updated. On the other hand, if the cache block is a miss in the L2 cache 14 and the L2CA signal is deasserted, the L2 cache 14 may not allocate storage for the cache block. The cache block may be stored only in the memory 26 by the memory controller 16 in this case. Accordingly, cache pollution may be avoided for data which is not likely to be accessed by the processor 12A-12B during processing of the packet. If the cache block is a hit in the L2 cache 14, the hitting cache block storage location is updated with the data transmitted during the transaction (regardless of whether or not the L2CA signal is asserted or deasserted), in the present embodiment.

It is noted that a signal may be defined to be asserted when driven to a first voltage representing a logical one, or alternatively when driven to a second voltage representing a logical zero. The signal may be defined to be deasserted when driven to the level opposite of the asserted level. In embodiments in which differential signalling is used, the signal is asserted when a first of the differential pair is lower than the second, and is deasserted when the second of the differential pair is lower than the first.

Figure 4:
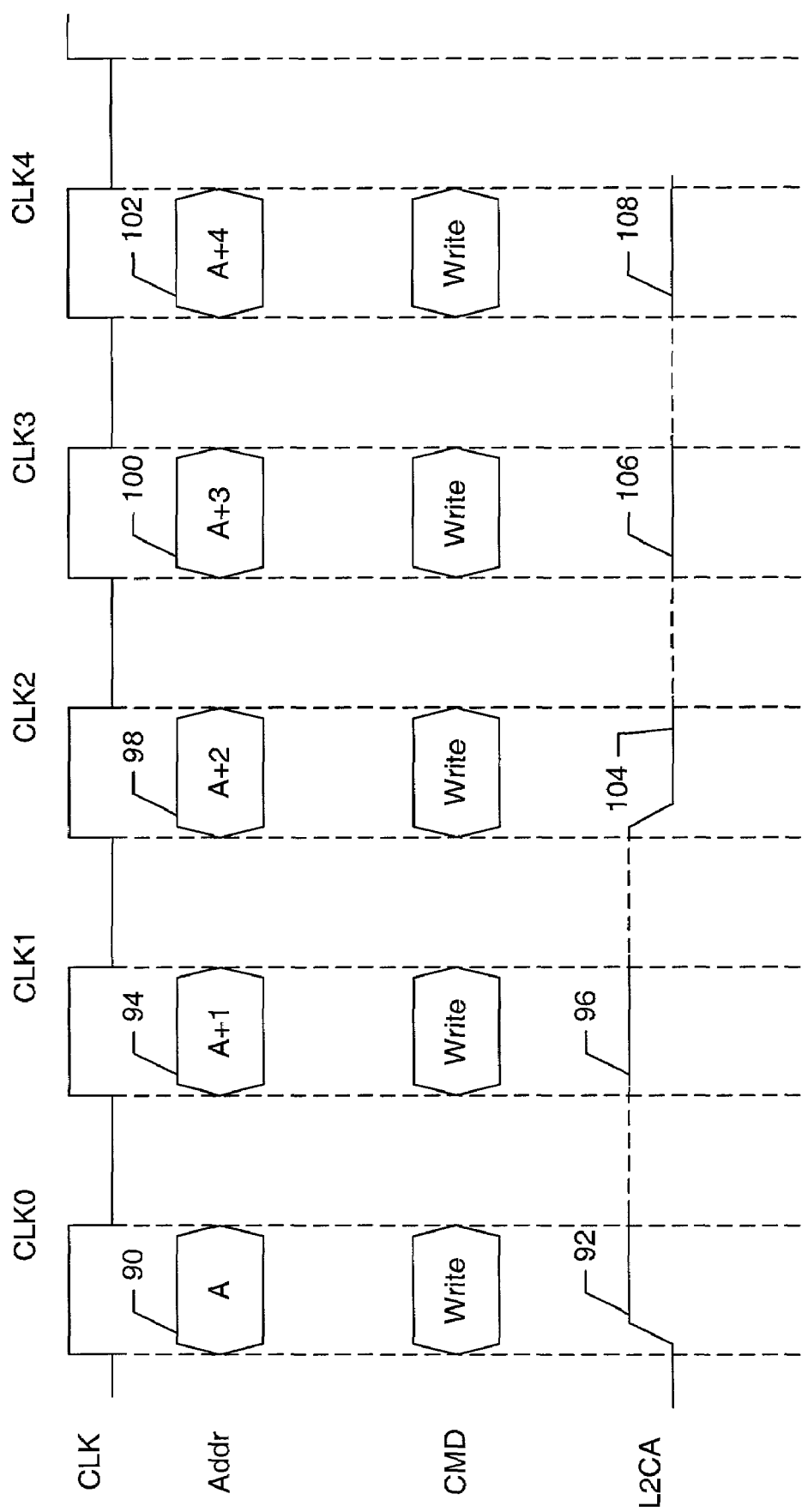
FIG. 4 is a timing diagram illustrating one embodiment of targeting of packet header data in the L2 cache.

Turning now to FIG. 4, a timing diagram illustrating several address phases of transactions performed by the packet interface circuit 22A (specifically, the DMA controller 38 through the I/O bridge 20) to transfer a packet is shown. Several clock cycles of the clock signal CLK corresponding to the bus 24 are shown. Each clock cycle is labeled at the top of FIG. 4 (CLK0, CLK1, etc.). Phases of the clock cycles are delimited by vertical dashed lines.

FIG. 4 illustrates an example in which the first five cache blocks of a received packet are transferred to memory/L2 cache. The addresses transmitted during the address phases of the five transactions are illustrated horizontally across from the label "Addr". The command for the transaction is illustrated horizontally across from the label "CMD". For each transaction, the command is a write. Specifically, the command may be a write with invalidate, causing any cached copies of the cache block to be invalidated (except in the L2 cache 14, which operates to lower the latency of the memory 26 rather than being associated with any specific agent). If cached copies of the cache block exist in agent caches, the data is stale since the data is being overwritten with the packet data. Finally, the L2CA signal is illustrated horizontally across from the label L2CA. The L2CA signal is illustrated as asserted high and deasserted low for this embodiment.

For this example, the packet interface circuit 22A is programmed (via the configuration register 42) to store the first two cache blocks of a received packet in the L2 cache 14. Accordingly, the packet interface circuit 22A asserts the L2CA signal for the first two transactions to transfer the received packet on the bus 24 and deasserts the L2CA signal for the remaining transactions. It is noted that the packet interface circuit 22A may be programmed to store none of the cache blocks in the L2 cache, one of the cache blocks, or more than two of the cache blocks, according to the portion of the packet expected to be processed by the processors 12A-12B.

The first transaction is the first cache block of the packet (clock cycle CLK0). The address of the transaction is the address of the data buffer indicated by the descriptor selected in response to receiving the packet (address "A" in FIG. 4—reference numeral 90). Additionally, since the first transaction is the first cache block of the packet, the L2CA signal is asserted for this transaction (reference numeral 92). The L2 cache 14 allocates a cache block storage location to store the cache block addressed by address "A" if the address is a miss, or updates the cache block if the address is a hit. Similarly, the second transaction is the second cache block of the packet, and thus is stored contiguous to the first cache block of the packet in the memory space. Thus, the address of the second transaction is the address "A+1" where "A+1" is the address "A" plus one cache block. The second transaction is shown in clock cycle CLK 1 (reference numeral 94). The L2CA signal is asserted for the second transaction as well, causing the block to be stored in the L2 cache 14.

The remaining three transactions to consecutive cache blocks (addresses "A+2", "A+3", and "A+4" at reference numerals 98, 100, and 102, respectively) are not to be allocated in the L2 cache 14. Thus, the L2CA signal is deasserted for these transactions (reference numerals 104, 106, and 108, respectively). If the addresses happen to hit in the L2 cache 14, the L2 cache 14 updates with the cache block. However, if the addresses miss in the L2 cache, the cache blocks are stored in the memory 26 by the memory controller 16 and the L2 cache 14 is not updated. While the L2 cache updates the cache block for a cache hit if the L2CA signal is deasserted, other embodiments may invalidate the cache block if the L2CA signal is deasserted, if desired.

It is noted that, in the illustrated embodiment, address phases occur during a phase of the clock signal CLK (e.g. during the high phase of the clock signal, although the low phase may be used). For the illustrated embodiment, signals on the bus 24 may be driven during one phase of the clock cycle and the other phase may be idle. More particularly, the other phase may be used to precharge the differential signal lines, in one embodiment. Thus, agents may drive the signal lines responsive to one edge of the clock signal CLK (e.g. the rising edge) and may sample the signal lines responsive to the falling edge. Other embodiments may drive and sample responsive to the same edge, like many external buses, or may drive and sample on both edges of the clock, like source synchronous designs. The L2CA signal is shown as dotted during the low phase of the clock in FIG. 4 to indicate that it is not being actively driven during this phase (and may be precharged).

It is noted that, while consecutive clock cycles are shown in FIG. 4 for transferring cache blocks of a packet, other transactions may generally intervene between each cache block transaction (e.g. from other agents on the bus 24). Furthermore, delays between cache block transactions may be experienced as the subsequent cache blocks are received by the packet interface circuit 22A. Thus, the transactions need not happen consecutively as shown in FIG. 4.

After the five transactions illustrated in FIG. 4 have completed (assuming no additional transactions and that the addresses A, A+1, A+2, A+3, and A+4 map to different cache block storage locations in the L2 cache 14), cache blocks corresponding to addresses A and A+1 would be cached. Addresses A+2, A+3, and A+4 may be cached, if cached prior to clock cycle CLK0, but are not allocated in response to the transactions illustrated in FIG. 4.

Figure 5:
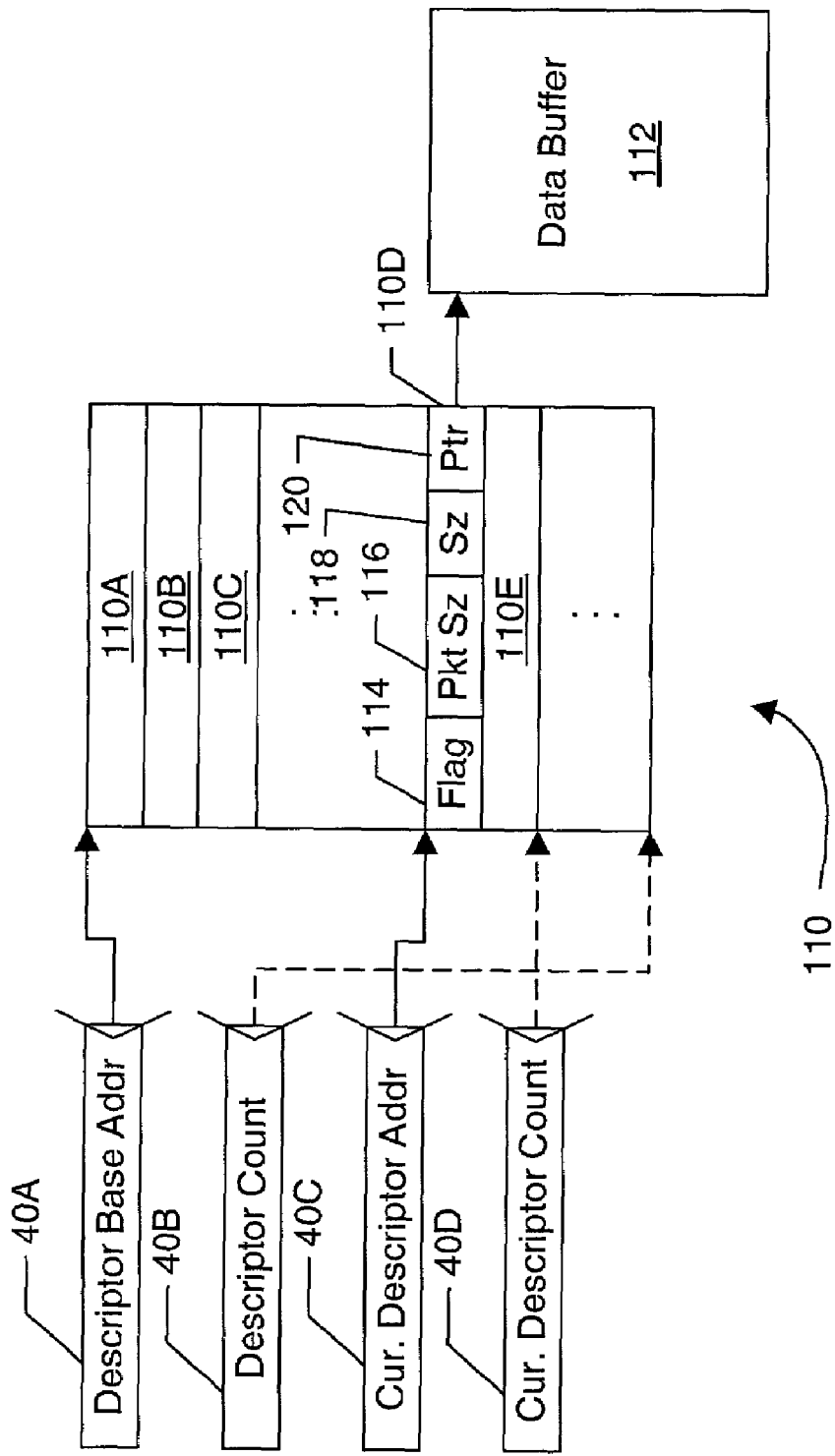
FIG. 5 is a block diagram of one embodiment of descriptors for a packet interface circuit shown in FIG. 1.

Turning next to FIG. 5, a block diagram of one embodiment of a set of descriptors allocated to a DMA controller 38 is shown. Other embodiments are possible and contemplated. In FIG. 5, configuration registers 40A, 40B, 40C, and 40D are shown, as well as a set of descriptors 110 (including descriptors 110A, 110B, 110C, 110D, and 110E). The descriptor 110D is shown in greater detail. A data buffer 112 indicated by the descriptor 110D is also shown in FIG. 5.

The configuration registers 40A-40D may be part of the configuration registers 40 shown in FIG. 1. The configuration register 40A stores a descriptor base address which indicates an area of memory storing the descriptors 110. The configuration register 40B stores a descriptor count which indicates the total number of descriptors. In combination with the descriptor base address, the descriptor count may indicate the extent of the area in memory storing the descriptors. In this embodiment, the descriptors are arranged as a ring. The next descriptor in the ring to be used by the packet interface circuit 22A is indicated by the current descriptor address stored in the configuration register 40C. A current descriptor count (stored in the configuration register 40D) indicates the number of descriptors currently available for use by the packet interface circuit 22A. The packet interface circuit 22A may not use descriptors outside of the descriptors between the current descriptor and the descriptor indicated by the current descriptor count.

Generally, the ring of descriptors 110 may be established by software executing on the system 10 and may be allocated to the packet interface circuit 22A by updating the configuration registers 40. Similar rings of descriptors may be allocated to the other packet interface circuits 22B-22C. A separate set of descriptors 110 may be allocated to each DMA channel within each packet interface circuits 22A-22C. For example, in one embodiment, each DMA controller 38 may comprise two receive DMA channels (for transmitting received packets to memory) and two transmit DMA channels (for transmitting packets from memory to the packet interface circuit). Thus, sets of configuration registers similar to configuration registers 40A-40D may be included for each DMA channel.

The descriptor 110D is shown in greater detail, and other descriptors may be similar. The descriptor 110D includes a flag (reference numeral 114), a packet size (reference numeral 116), a data buffer size (reference numeral 118), and a data buffer pointer (reference numeral 120). The data buffer pointer 120 is the address of a data buffer into which the packet data is to be stored. The data buffer size 118 is the size of the data buffer. The packet size 116 is the size of the packet stored in the data buffer 112 (and possibly data buffers of subsequent descriptors, if the packet size is larger than the data buffer size, as will be described in more detail below). The flag 114 is an indication of whether or not a packet is stored in the data buffer 112. For example, the flag 114 may be a bit indicative, when set, that the descriptor is storing a packet and indicative, when clear, that the descriptor is not storing a packet. Alternatively, the set and clear states of the bit may be defined in the opposite manner.

It is noted that, while the illustrated embodiment shows a ring of descriptors 110, other embodiments may arrange the descriptors in other fashions. For example, a linked list of descriptors may be used. In such an embodiment, the descriptor base address in the configuration register 40A may be the head of the linked list, and the descriptor count in the configuration register 40B may be the number of descriptors in the linked list. The current descriptor address in the configuration register 40C may point to the current descriptor within the linked list, and the current descriptor count in the configuration register 40D may indicate the number of descriptors in the linked list, beginning with the current descriptor, which are available for use by the packet interface circuit 22A. Since the members of a linked list need not be stored in contiguous addresses, the descriptors may include an additional pointer field (in addition to the data buffer pointer 120 shown in FIG. 5) to point to the next descriptor. In one specific embodiment, the system may support both the ring and the linked list modes. In such an embodiment, the second pointer may be used to point to a second data buffer in ring mode (i.e. the descriptors may each indicate two data buffers).

It is noted that a variety of other information may be included in the descriptors 110 in addition to the information shown in FIG. 5, as desired. For example, status information, errors detected during the reception, etc. may be included for received packets.

Figure 6:
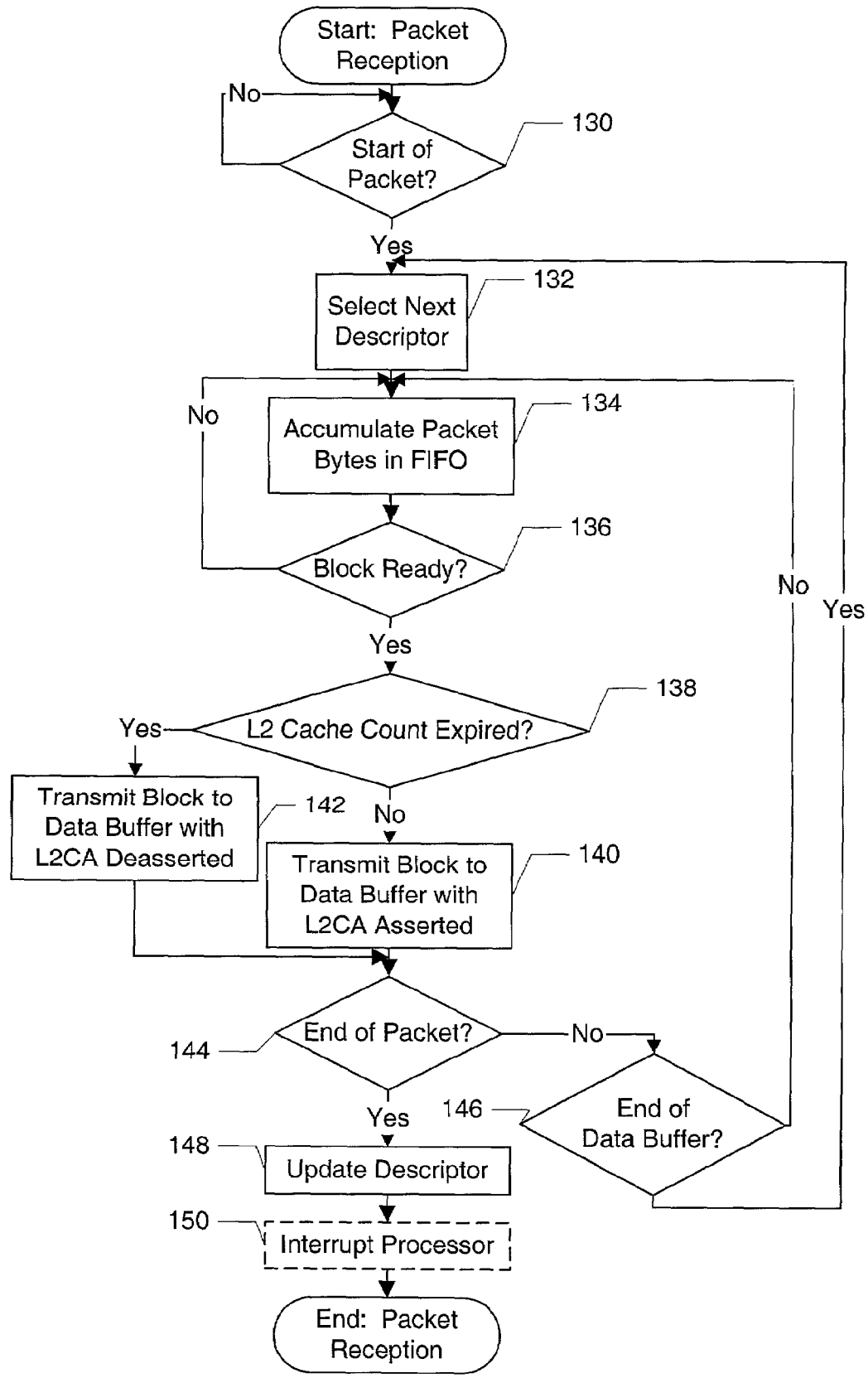
FIG. 6 is a flowchart illustrating operation of one embodiment of the packet interface circuit shown in FIG. 1 during packet reception.

Turning next to FIG. 6, a flowchart is shown illustrating operation of the packet interface circuit 22A (or any of the other packet interface circuits 22B-22C) during reception of a packet from the external packet interface for processing in the system 10. Other embodiments are possible and contemplated. The blocks shown in FIG. 6 are illustrated in a particular order for ease of understanding, but any order may be used, as desired.

The packet interface circuit 22A detects whether or not a start of a packet is received on the packet interface 44A (decision block 130). If the start of a packet is not received, the receive packet logic circuitry may be idle. Depending on the mode, a start of a packet may be detected in a variety of fashions. If the packet interface circuit 22A is operating as an Ethernet MAC, the start of a packet is detected according to the Ethernet specification. If the generic packet interface is used, control signals marking the beginning of the packet (or the end of the previous packet) may be used to detect the beginning of a packet.

If a start of a packet is received, the packet interface circuit 22A (specifically the DMA controller 38) selects the next descriptor 110 for transferring the packet thereto (block 132). The descriptor indicated by the current descriptor address is selected. The packet interface circuit 22A accumulates packet bytes in the Rx FIFO 34 (block 134) until at least a cache block is ready for transfer (decision block 136). In some embodiments, the packet interface circuit 22A may wait until more than one cache block is ready for transfer, if desired.

If a cache block is ready for transfer, the DMA controller 38 transfers the cache block to the memory 26 or the L2 cache 14. More particularly, the DMA controller determines whether or not the number of cache blocks (measured from the beginning of the packet) indicated in the configuration register 42 have been transferred with respect to the packet being received (decision block 138). The DMA controller 38 may track the number of blocks transferred on a given receive DMA channel to determine if the number of indicated cache blocks have yet been transferred, and may compare the count to the number of blocks indicated. Alternatively, the DMA controller 38 may initialize a counter with the number of indicated cache blocks and decrement the counter as blocks are transferred.

If the number of transferred cache blocks is still less than or equal to the L2 count (decision block 138), the DMA controller 38 transmits the cache block in a transaction with the L2CA signal asserted (block 140). On the other hand, if the number of transferred blocks is greater than the L2 count, the DMA controller transmits the cache block in a transaction with the L2CA signal deasserted (block 142).

The packet interface circuit 22A is also configured to detect the end of the packet (decision block 144). The packet end may be indicated by the length of the packet (indicated within the packet for Ethernet packets) or may be indicated by control signals (such as in the generic packet interface). If the end of the packet is not detected, the packet interface circuit 22A may determine if the end of the data buffer has been reached (decision block 146). The data buffers indicated by the descriptors may or may not be large enough to contain the entire packet. If the data buffers are as large as the largest packet, the check represented by decision block 146 may be eliminated. If the end of the data buffer has been reached (as indicated by the data buffer size 118 in the descriptor), the DMA controller 38 may select the next descriptor and beginning storing the packet in the data buffer indicated by that descriptor (block 132). On the other hand, if the end of the current data buffer has not been reached, the packet interface circuit 22A may continue with the current data buffer.

If the end of the packet has been reached, the DMA controller 38 may update the descriptor (block 148). Specifically, the DMA controller 38 may update the packet size 116 to indicate the size of the packet in the data buffer indicated by the descriptor. Additionally, the DMA controller 38 may set the flag bit 114 to indicate that the packet is available in the data buffer for processing. As mentioned above, in some embodiments a packet may occupy one or more data buffers corresponding to one or more descriptors, depending on the size. The first descriptor selected for the packet may be updated if more than one descriptor is used, in one embodiment.

The DMA controller 38 may additionally update the configuration register 40C to indicate the next unused descriptor, and may decrement the current descriptor count in the configuration register 40D to reflect the use of one or more descriptors for storing the packet. If the current descriptor count is zero (or below a threshold, depending on the embodiment), the DMA controller 38 may interrupt the processor to have more descriptors validated for use.

Optionally, the packet interface circuit 22A may interrupt a processor (block 150). The processor may thus be informed that the packet is available for processing. Alternatively, the processors may periodically poll the descriptors to corresponding to receive DMA channels to detect if the flag bit is set.

It is noted that the packet interface circuit 22A may perform certain error checking on received packets (e.g. detecting packet collision on the received packet, CRC errors, etc.), which is not illustrated in FIG. 6. If a packet error is detected, the packet may be dropped and the error may (in some embodiments) be logged.

It is noted that the detection of packet start and end, and the accumulation of packet data may be performed by the Tx/Rx control circuit 32 independently and in parallel with the descriptor management and the transfer of blocks, which may be handled by the DMA controller 38. The blocks shown in FIG. 6 may thus be a simplified view for illustrating the L2 cache allocation.

Figure 7:
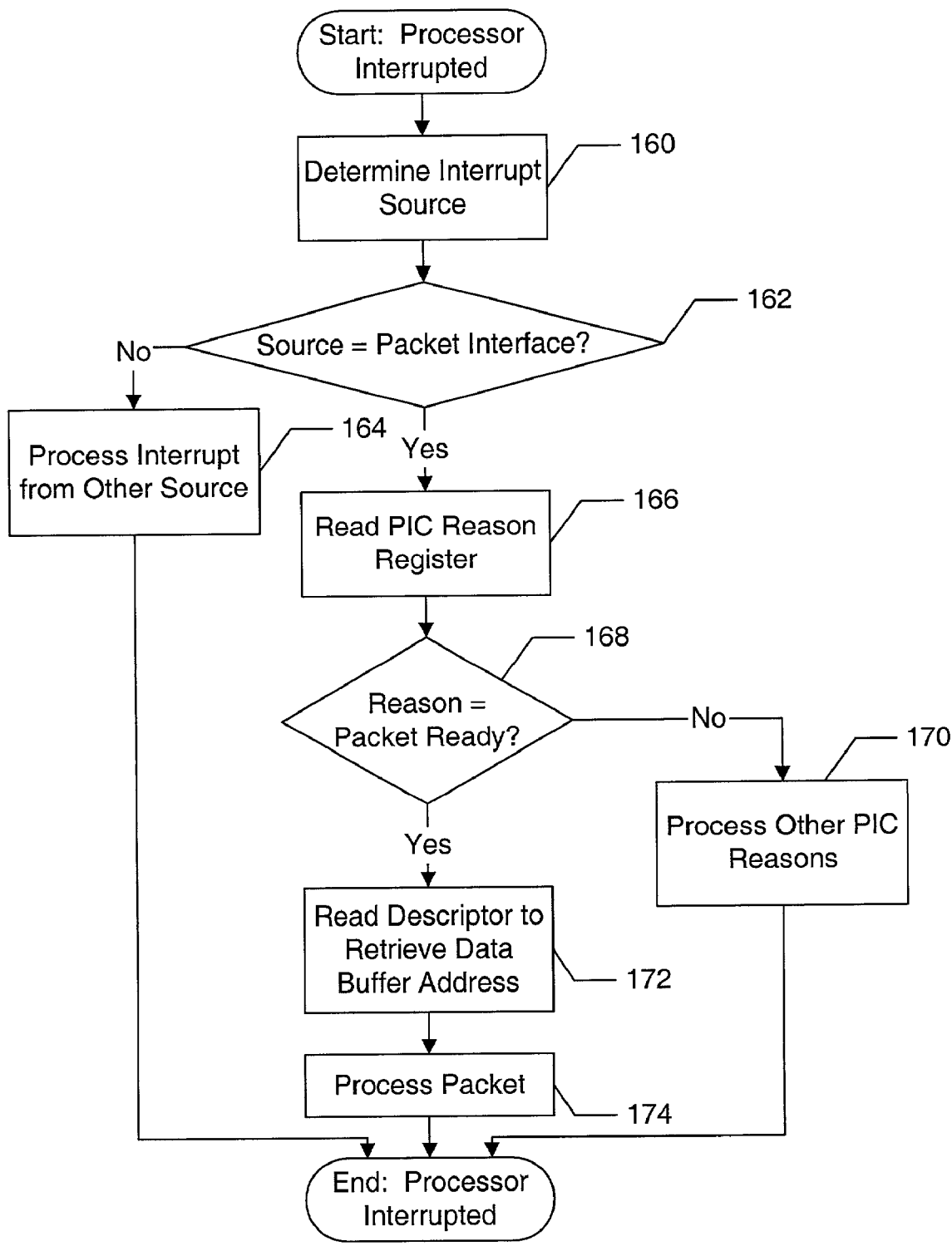
FIG. 7 is a flowchart illustrating operation of one embodiment of a processor having been interrupted.

Turning next to FIG. 7, a flowchart illustrating operation of a processor 12A-12B in response to being interrupted is shown. Other embodiments are possible and contemplated. It is noted that the blocks of FIG. 7 may be implemented in software executing on the processor 12A-12B (e.g. an interrupt service routine), hardware, or a combination thereof. While the blocks shown are illustrated in a particular order for ease of understanding, other orders may be used.

The processor reads one or more resources in the system 10 to determine the source of the interrupt (block 160). For example, the interrupt mapper 28 may include a source register indicating the source of an interrupt. If the source is not a packet interface circuit (or PIC in FIG. 7) (decision block 162), the processor may continue within interrupt processing in any desired fashion (block 164). If the source is a packet interface circuit, the processor may further read a packet interface circuit reason register to determine the reason for the interrupt (block 166). The reason register could be located in the interrupt mapper 28, or in the packet interface circuit 22A-22C, as desired.

If the reason for the interrupt is other than that one or more packets are ready for processing (decision block 168), the processor may process the other reasons in any appropriate fashion (block 170). For example, one reason may be that the packet interface circuit has used all the available descriptors (or has less than a threshold number of descriptors remaining for use). The processor may allocate data buffers, point descriptors within the set of descriptors allocated to the packet interface circuit (and to the DMA channel within the packet interface circuit) to the data buffers, and update the configuration registers 40 to reflect the allocated data buffers and updated descriptors. In one embodiment, the current descriptor count is updated by writing the number of newly added descriptors to the configuration register 40D. The DMA controller 38 may add the number to the current descriptor count in response to the write. A variety of other reasons for interrupt by the packet interface circuits may be supported, as desired.

If the reason for the interrupt is that one or more packets are ready, the processor may read the descriptor storing the packet (or storing the beginning of the packet, if data buffers from more than one descriptor are used to store the packet) to obtain the address of the beginning of the packet (block 172). For example, the processor may read the configuration register 40C and search backward through the ring for the first descriptor having a set flag bit 114. Alternatively, the packet interface circuit may supply the descriptor address of the first descriptor ready for processing in a register readable by the processor. In yet another alternative, the processor may read the descriptor base address register 40A and search forward until a descriptor having a set flag bit 114 is located. The processor may process the packet located by the descriptor (block 174). If the L2CA signal was used to allocate a portion of the packet into the L2 cache 14 during transmission from the packet interface circuit to the L2 cache 14/memory 26, then the processor may experience L2 cache hits for the portion of the packet to be processed, which may decrease the latency of access to the packet (and thus may improve packet processing performance).

Figure 8:
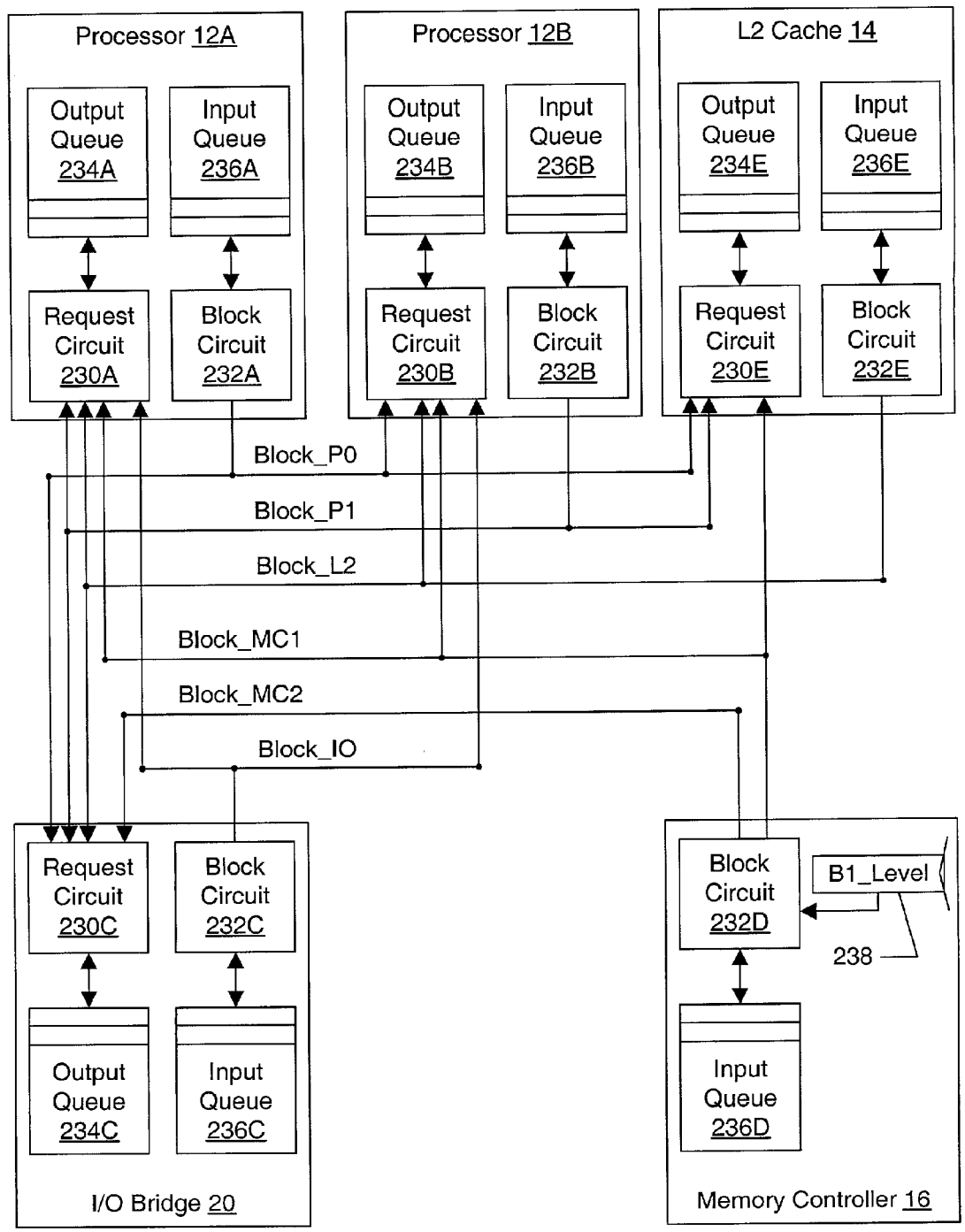
FIG. 8 is a block diagram of one embodiment of various units from FIG. 1, illustrating block signals provided between the units for blocking initiation of transactions.

As mentioned above, when a given packet interface circuit 22A-22C is transmitting a packet from the system 10 on the packet interface, packet transmission may fail (the packet may be dropped by the receiver and require retransmission) if the packet is not continuously transmitted on the packet interface. One source of delay in transmitting the packet which may cause the failure of the transmission may be latency in reading the packet from memory. The latency may in part be due to transactions initiated by other agents (e.g. the processors 12A-12B, the L2 cache 14 for evict copybacks, or other I/O device read/write transactions). Furthermore, the packet interface circuits may be delayed during times of high contention for the bus 24 by the round robin priority scheme for arbitration. The memory controller 16 may implement a separate block signal for the packet interface circuits 22A-22C than for the other agents to alleviate the problem of transmitted packets being dropped. More specifically, in one embodiment, the block signals may be part of a general blocking scheme for flow control on the bus 24, as illustrated in FIG. 8. Alternatively, other embodiments may implement block signals only from the memory controller 16, if desired. A description of the general blocking scheme follows.

Generally, the processors 12A-12B, the L2 cache 14, and/or the I/O bridge 20 may initiate transactions on the bus 24. The system 10 supports various types of transactions on the bus 24, including memory transactions (as described above) and I/O transactions which target an I/O device (e.g. a device coupled through the I/O bridge 20 or another I/O bridge, not shown). Any of the processors 12A-12B, the L2 cache 14, the memory controller 16, or the I/O bridge 20 may be a participant in the transactions. Generally, an agent "participates" in a transaction if the agent is required to take action during the transaction in order for the transaction to complete properly. The agent "does not participate" in a transaction if the agent is not required to take any action during the transaction in order for the transaction to complete properly. Similarly, the agent is a "participant" in the transaction if the agent is required to take action during the transaction in order for the transaction to complete properly. An agent is referred to as a participant in a particular transaction even if that transaction has not yet been initiated on the bus 24, if that agent would take action during the particular transaction when that particular transaction is performed. The agent is a "non-participant" in the transaction if the agent is not required to take any action during the transaction in order for the transaction to complete properly. An agent is referred to as a non-participant in a particular transaction even if that transaction has not yet been initiated on the bus 24, if that agent would not take action during the particular transaction when that particular transaction is performed. The agent targeted by the transaction participates in the transaction. Additionally, other agents may participate in various transactions. For example, the processors 12A-12B (and the I/O bridge 20, in some embodiments) may participate in coherent memory transactions by taking action to ensure coherency (e.g. snooping internal caches and indicating the result of the snoop). The L2 cache 14 may participate in cacheable memory transactions by determining if the transaction is a hit and providing the data or updating the data stored therein in response to the transaction. As used herein, the term "snoop" or "snooping" refers to checking a cache to determine if data corresponding to a memory location affected by a transaction is present in the cache, and signalling the state of the data to ensure that coherency of the data is maintained.

An addressable range of the system 10 is defined by the size of the addresses which may be transmitted on the bus 24. The addressable range may be divided into several address spaces including a memory address space and various I/O address spaces. In this embodiment, the address space which includes the address of a transaction may identify the type of the transaction. Thus, an address within the memory address space indicates that the transaction is a memory transaction and the address identifies a targeted memory location in the memory 26 (and thus the memory controller 16 and the L2 cache 14 may respond to the transaction, and the processors 12A-12B may participate in the transaction by snooping). An address within the I/O address spaces indicates that the transaction is an I/O transaction and the address targets an I/O device. The I/O devices may include packet interface circuits 22A-22C, other I/O devices or interfaces coupled to the bus 24 through the I/O bridge 20, and any devices or interfaces coupled through other I/O bridges (not shown). Each of the I/O address spaces may be assigned to the I/O bridge to which the corresponding I/O device or bridge is coupled.

While address spaces are used to determine which type of transaction is being performed (and the target of the transaction), other embodiments may determine these attributes in other ways. For example, different instructions may be used to cause different types of transactions or to target different devices. Control signals on the bus may be used to identify the target.

Turning now to FIG. 8, a block diagram illustrating additional details of one embodiment of the processors 12A-12B, the L2 cache 14, the memory controller 16, and the I/O bridge 20 is shown. FIG. 8 also illustrates one embodiment of certain interconnect between the above agents. Other embodiments are possible and contemplated. In the embodiment of FIG. 8, the processor 12A includes a request circuit 230A, a block circuit 232A, an output queue 234A and an input queue 236A. Request circuit 230A is coupled to receive a block signal from each other agent on bus 24 (specifically the Block_MC1 signal from the memory controller 16), and is coupled to the output queue 234A. The block circuit 232A is coupled to the input queue 236A and is configured to generate a Block_P0 signal. The processor 12B includes a similar set of elements including the request circuit 230B, the block circuit 232B, the output queue 234B, and the input queue 236B. The I/O bridge 20 is also similarly configured, including the request circuit 230C, the block circuit 232C, the output queue 234C and the input queue 236C. The L2 cache 14 may also be similarly configured, including a request circuit 230E, a block circuit 232E, an output queue 234E, and an input queue 236E. The memory controller 16 includes a block circuit 232D and an input queue 236D, as well as a configuration register 238. The block circuit 232D is coupled to the input queue 236D and the configuration register 238.

Generally, each agent captures the transactions for which that agent is a participant. The transaction are captured in that agent's input queue 236A-236E. The agent may remove the transaction from its input queue 236A-236E to process the transaction. Each input queue 236A-236E may be sized (i.e. the number of entries determined) based on the expected latency for processing the transactions in the participating agent and the number of additional transactions expected during that latency period, etc. It is typically not desirable to provide a queue having enough entries to store the maximum number of transactions which might occur, since frequently many of the queue entries would go unused and thus would be wasteful of circuit area in the agent. Accordingly, the input queues may be sized for the most likely number of transactions during ordinary transaction sequences, and the queue may become full in some cases. For example, I/O transactions tend to be longer latency than memory transactions, but also tend to occur less frequently. Thus, the input queue 236C may include relatively few entries. On the other hand, lower-latency memory transactions may occur much more frequently and thus the input queues 236A-236B and 236E may include a larger number of entries. Any of the input queues 236A-236E may become full, however, and thus the agent including the full input queue may be incapable of participating in additional transactions until input queue entries are free to store additional transactions.

The block circuits 232A-232E are provided to determine if the corresponding input queue 236A-236E is becoming full, and to generate a block signal if the corresponding input queue 236A-236E is becoming full. In the illustrated embodiment, each block circuit 232A-232E generates a separate block signal, as follows: The block circuit 232A generates Block_P0; the block circuit 232B generates Block_P1; the block circuit 232C generates Block_IO; the block circuit 232D generates Block_MC1 and Block_MC2; and block circuit 232E generates Block_L2. The block signal may be asserted to indicate that the corresponding agent is unavailable to participate in additional transactions, and deasserted to indicate that the corresponding agent is available to participate in additional transactions.

Each requesting agent (e.g. the processors 12A-12B, the I/O bridge 20, and the L2 cache 14) includes a request circuit 230A-230E, which receives block signals, and an output queue 234A-234E. The requesting agent may queue transactions to be initiated on the bus 24 in the corresponding output queue 234A-234E. The request circuits 230A-230E are coupled to the respective output queues 234A-234E, and determine if the corresponding agent is allowed to initiate transactions from the respective output queue onto the bus 24 responsive to the block signals. More particularly, the request circuit 230A-230E blocks the initiation of a first transaction in the corresponding output queue 234A-234E if any agent which is a participant in the first transaction is asserting its block signal. Thus, the source of each transaction may selectively block or not block initiation of the transaction dependent on whether or not the other participant(s) in the transaction is(are) currently able to participate. In the illustrated embodiment, the L2 cache 14 may be a requesting agent for memory space transactions only, and thus may receive only those signals used for memory transactions (e.g. Block_P0, Block_P1, and Block_MC1). Other embodiments may include the Block_IO signal as well (e.g. if the I/O bridges may temporarily cache data and thus may snoop memory transactions).

In this manner, transactions which cannot be completed due to a participating agent being incapable of participating are not initiated on the bus 24. On the other hand, transactions for which no participant is asserting a block signal are allowed to be initiated on the bus 24. In other words, a given transaction is not blocked by an agent which is a non-participant in that transaction. Thus, due to the granularity of the blocking (e.g. each agent independently indicating its ability to participate), transactions may be performed even though a non-participating agent is blocking transactions.

The request circuits 230A-230E may block initiation of transactions in a number of ways. For example, if a block signal for a participating agent is asserted before the corresponding agent wins arbitration of the bus 24 to perform the blocked transaction, the request circuits 230A-230E may inhibit arbitration (or further arbitration) to perform the blocked transaction until the block signal is deasserted. The corresponding agent may arbitrate to perform other, non-blocked transactions, if desired. On the other hand, if the block signal is not asserted before the corresponding agent wins arbitration, the request circuit 230A-230E may cause the agent to drive an invalid command encoding on the bus.

In this case, the bandwidth is not conserved, but the transaction is not performed and thus no need to retry the transaction occurs.

While most of the participants illustrated in FIG. 8 produce a single block signal, the memory controller 16 includes two block signals: Block_MC1 and Block_MC2. The request circuits 230A, 230B, and 230E are each coupled to receive the Block_MC1 signal, and the request circuit 230C is coupled to receive the Block_MC2 signal. In some embodiments (e.g. embodiments in which the I/O bridge 20 is coupled to other I/O devices), the request circuit 230C may also be coupled to receive the Block_MC1 signal for use in blocking requests from the other I/O devices.

Each of the request circuits 230A-230E use the block signal received from the memory controller 16 to block memory transactions (if the block signal is asserted). Thus, the processors 12A-12B and the L2 cache 14 may block memory transactions if the Block_MC1 signal is asserted, while the I/O bridge 20 may block transactions if the Block_MC2 signal is asserted. Accordingly, other agents may be blocked and the packet interface circuits 22A-22C may be allowed to continue initiating memory transactions by the memory controller 16 asserting the Block_MC1 signal and deasserting the Block_MC2 signal. Particularly, the Block_MC1 signal may be asserted if the number of transactions queued in the input queue 236D exceeds a first threshold, and the Block_MC2 signal may be asserted when the input queue 236D is becoming full (or is full) similar to the other block signals from the other agents. Generally, the first threshold may be less then the number of transactions in the input queue 236D at which the Block_MC2 signal is asserted.

In one embodiment, the threshold for asserting the Block_MC1 signal may be programmable in the configuration register 238. The configuration register 238 may store an indication of the first threshold. The indication may be the number of entries which are to be free for storing transactions before the Block_MC1 signal is deasserted, the number of entries which, if occupied by transactions, cause the Block_MC1 signal to be asserted, a percentage of the total number of entries which causes the Block_MC1 signal to be asserted or deasserted, etc. Alternatively, the first threshold may be fixed, if desired.

As mentioned above, a block circuit 232A-232E may assert the corresponding block signal if the corresponding input queue 236A-236E is becoming full. More particularly, the block circuit 232A-232E may assert the corresponding block signal if the number of free (currently unused) entries falls to a predetermined threshold. The threshold may be zero, if the block signal can be generated soon enough to block any subsequent transaction that may require participation by the corresponding agent. However, in one embodiment, arbitration and transaction initiation are pipelined. Thus, the initiation of a transaction which would fill the last free input queue entry may occur in parallel with the arbitration for a transaction which would also require an input queue entry in that agent. Accordingly, in such an embodiment, the threshold may be one. In response to a transaction which fills the second to last free queue entry, leaving one free queue entry, the corresponding block circuit 232A-232E asserts its block signal.

It is noted that each of the input queues 236A-236E may include a suitable number of entries, and may differ from the number of entries in other input queues 236A-236E. Similarly, each of the output queues 234A-234E may include a suitable number of entries, and may differ from the number of entries in other output queues 234A-234E.

It is further noted that, while the above description refers to input queue full scenarios as a reason for being unavailable to participate in additional transactions, a given agent may have other reasons for being unavailable to participate in additional transactions, as desired. The block signals may be used as described above for such scenarios as well.

Figure 9:
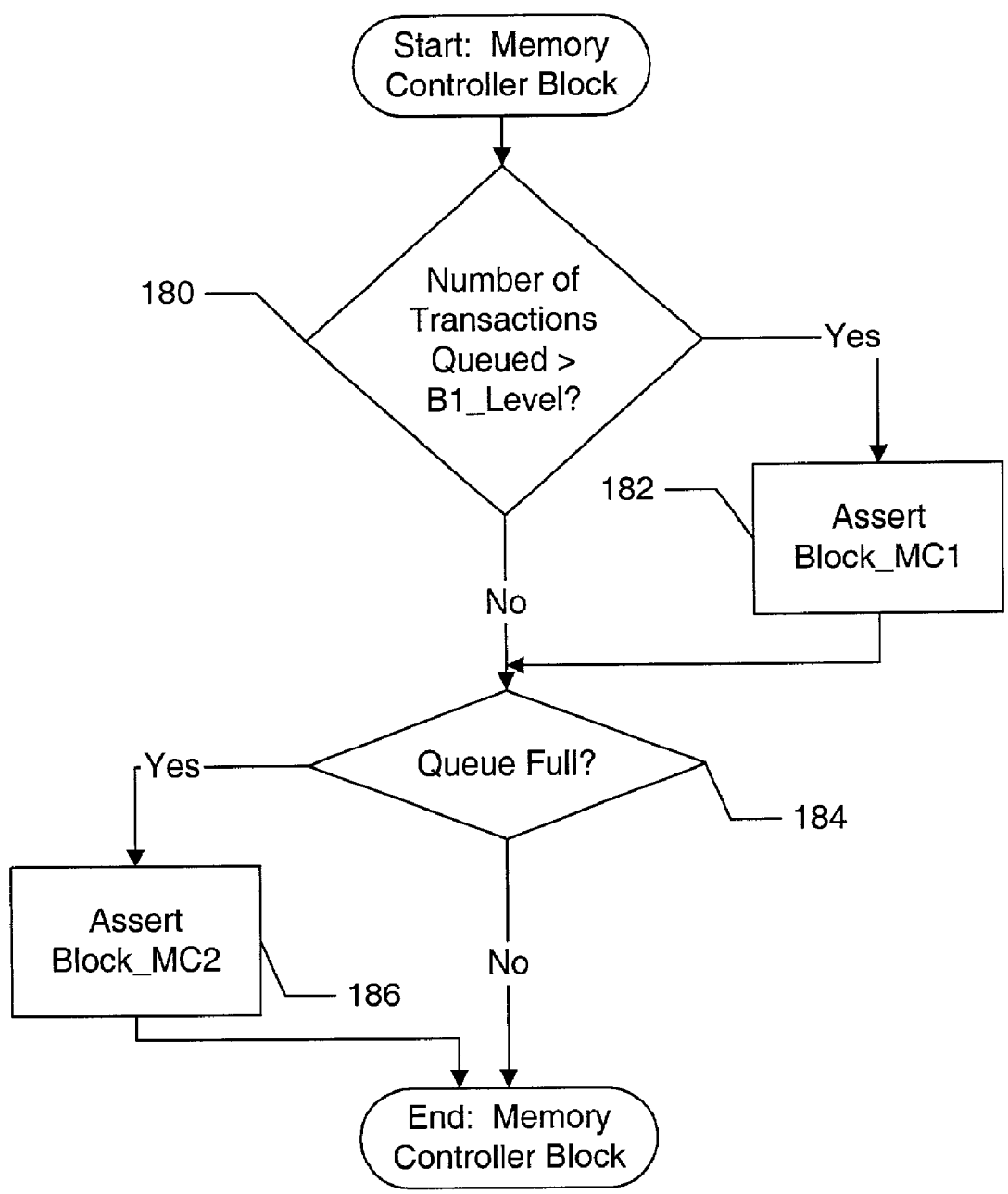
FIG. 9 is a flowchart illustrating operation of one embodiment of the memory controller shown in FIG. 8 for asserting the block signals.

Turning next to FIG. 9, a flowchart is shown illustrating operation of one embodiment of the memory controller 16 shown in FIG. 8. Other embodiments are possible and contemplated. The blocks shown in FIG. 9 are illustrated in a particular order for ease of understanding. However, any order may be used. Specifically, blocks 180 and 182, as a group, and blocks 184 and 186, as a group, are independent and may be performed in either order or in parallel. Specifically, combinatorial logic circuitry within the memory controller 16 may perform the groups in parallel.

If the number of transactions queued in the input queue 236D is greater than the threshold set in the configuration register 238 (decision block 180), the memory controller 16 asserts the Block_MC1 signal (block 182). Otherwise, the Block_MC1 signal is deasserted. Equivalently, the test in block 180 may be that the number of free entries in the input queue 236D is less than the threshold set in the configuration register 238.

If the input queue 236D is full (or becoming full, as described above) (decision block 184), the memory controller asserts the Block_MC2 signal (block 186). Otherwise, the Block_MC2 signal is deasserted.

Figure 10:
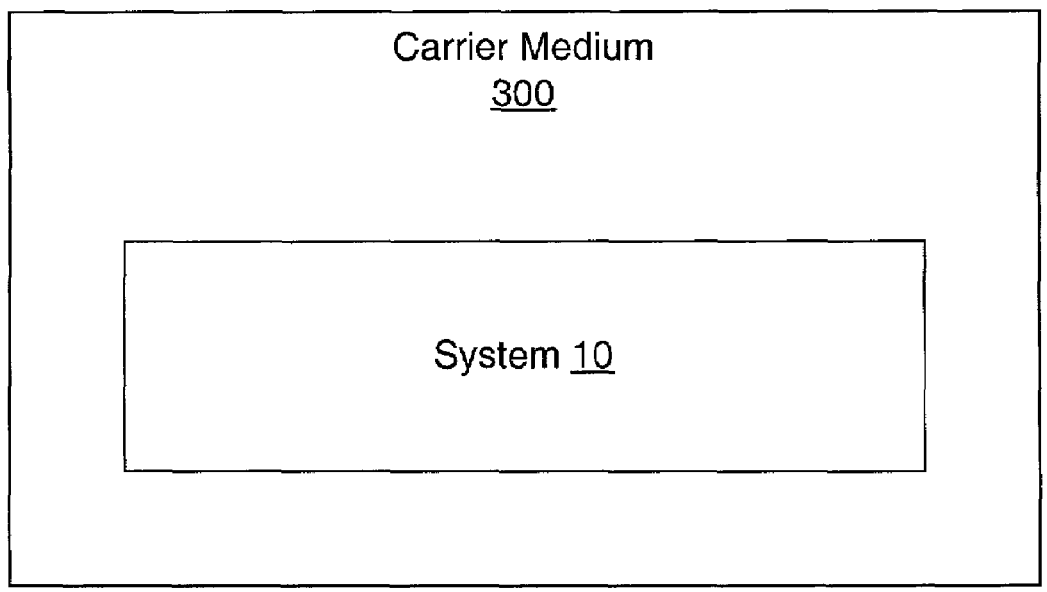
FIG. 10 is a block diagram of one embodiment of a carrier medium.

Turning next to FIG. 10, a block diagram of a carrier medium 300 including a database representative of the system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of the system 10 carried on the carrier medium 300 may be a database which can be read by a program and used, directly or indirectly, to fabricate the hardware comprising the system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database on the carrier medium 300 may be the netlist (with or without the synthesis library) or the data set, as desired.

While the carrier medium 300 carries a representation of the system 10, other embodiments may carry a representation of any portion of the system 10, as desired, including any set of agents (e.g. the processors 12A-12B, the L2 cache 14, the memory controller 16, and/or the I/O bridge 20), packet interface circuits 22A-22C, or portions thereof, the bus 24, etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a processor coupled to a bus;
   a cache memory coupled to the bus to cache a portion of a data packet in cache blocks for the integrated circuit;
   a memory controller coupled to the bus; and
   a plurality of packet interface circuits to interface to one or more connections external to the integrated circuit to receive and send packets, each packet interface circuit to include a receive/transmit control unit, a receive buffer and a transmit buffer to receive a data packet from an external connection, temporarily store the received data packet in the receive buffer, cache first N cache blocks of the received data packet that includes a header in the cache memory with a cache hit when a control signal is asserted, in which a number for N is determined by a value stored in a register, store a payload of the received data packet in a memory coupled to the memory controller without caching and transfer the first N blocks onto the bus for use by the processor, in which the processor causes a cache hit to the cached first N cache blocks to retrieve the payload from the memory; each packet interface circuit to store all of the received data packet in the memory without caching when the control signal is not asserted with a cache miss; each packet interface circuit to update the cache with the data packet with a cache hit regardless of assertion or de-assertion of the control signal; and each packet interface circuit also to temporarily store the received data packet in the transmit buffer and to retransmit the data packet onto an external connection, wherein the processor, the cache memory, the memory controller, and the packet interface circuits are integrated onto a single semiconductor substrate to operate as a system on a chip.

2. The integrated circuit as recited in claim 1 wherein the memory controller is coupled to provide a first block signal for the packet interface circuits and a second block signal for other devices coupled to the bus, and wherein memory transactions from the packet interface circuits are inhibited from initiation on the bus in response to an assertion of the first block signal, and wherein the other devices are configured to inhibit initiating memory transactions on the bus in response to an assertion of the second block signal.

3. The integrated circuit as recited in claim 2 wherein the memory controller comprises an input queue having a plurality of entries for transactions, and wherein the memory controller is configured to assert the second block signal responsive to a number of the plurality of entries which are available being less than a first number.

4. The integrated circuit as recited in claim 3 wherein the memory controller is further configured to assert the first block signal in response to the number of the plurality of entries which are available being less than a second number, the second number being less than the first number.

5. The integrated circuit as recited in claim 1 wherein the first N cache blocks include the header and a portion of the payload.

6. The integrated circuit as recited in claim 1 wherein the control signal is asserted during an address phase of a transaction on the bus.

7. The integrated circuit as recited in claim 1 wherein at least one of the one or more connections is for an Ethernet media access.

8. The integrated circuit as recited in claim 1 wherein the packet interface circuits are coupled to the bus through a bus bridge.

9. A method comprising:
   receiving a data packet from an external connection to an integrated circuit into one of a plurality of packet interface circuits resident on the integrated circuit;
   storing the received data packet temporarily in a receive buffer of the packet interface circuit;
   determining if there is a cache miss or a cache hit with the received data packet;
   caching a first N cache blocks of the received data packet that includes a header in a cache memory with a cache miss when a control signal is asserted, in which a number for N is determined by a value stored in a register, but not caching any portion of the received data packet in the cache memory with a cache miss when the control signal is not asserted;
   updating the cache memory with the received data packet with a cache hit regardless of assertion or de-assertion of the control signal;
   storing remaining portion of the received data packet in a memory without caching with a cache miss and the control signal asserted, but storing all of the received data packet in the memory with a cache miss and the control signal not asserted;
   transferring the first N cache blocks onto an internal bus of the integrated circuit for use by a processor resident on the integrated circuit;
   causing a cache hit to the cached first N cache blocks by the processor to retrieve the payload from the memory;
   storing temporarily the received data packet in a transmit buffer; and
   retransmitting the data packet onto an external connection, wherein the processor, the cache memory and the packet interface circuits are integrated onto a single semiconductor substrate to operate as a system on a chip.

10. The method as recited in claim 9 further comprising:
    having a memory controller coupled to the memory to provide a first block signal for the packet interface circuits and a second block signal for other devices coupled to the bus;
    inhibiting initiating memory transactions on the bus from the packet interface circuits in response to an assertion of the first block signal; and
    having the other devices inhibit initiating memory transactions on the bus in response to an assertion of the second block indication.

11. The method as recited in claim 10 further comprising having the memory controller assert the second block signal responsive to a number of a plurality of entries in an input queue of the memory controller which are available being less than a first number.

12. The method as recited in claim 11 further comprising having the memory controller assert the first block signal in response to the number of the plurality of entries which are available being less than a second number, the second number being less than the first number.

13. The method as recited in claim 9 wherein the first N cache blocks include the header and a portion of the payload.

* * * * *

UNITED STATES PATENT AND TRADEMARK OFFICE
CERTIFICATE OF CORRECTION

PATENT NO. : 7,287,649 B2
APPLICATION NO. : 09/861188
DATED : October 30, 2007
INVENTOR(S) : Mark Hayter et al.

It is certified that error appears in the above-identified patent and that said Letters Patent is hereby corrected as shown below:

On the Title Page, Item (54): The title should appear as follows: --System on a chip for caching of data packets based on a cache miss/hit and a state of a control signal--.

Column 1, lines 1-2: The title should appear as follows: --System on a chip for caching of data packets based on a cache miss/hit and a state of a control signal--.

Signed and Sealed this

Second Day of December, 2008

JON W. DUDAS
*Director of the United States Patent and Trademark Office*